INVENTOR.
VINOD SUNDRA
BY KENWAY, JENNEY, WITTER & HILDRETH
ATTORNEYS

INVENTOR.
VINOD SUNDRA
BY KENWAY, JENNEY, WITTER & HILDRETH
ATTORNEYS

United States Patent Office 3,118,975

Patented Jan. 21, 1964

3,118,975

AUTOMATIC TELEPHONE DIALING SYSTEM

Vinod Sundra, Allston, Mass.
(Lexington Road R.F.D., Lexington 73, Mass.)

Filed Apr. 29, 1960, Ser. No. 25,681
7 Claims. (Cl. 179—90)

This invention relates in general to an automatic telephone dialing system and in particular to an accessory for a conventional telephone which automatically dials a number until the number is reached.

An annoying and time-consuming fault with dial telephones arises from the fact that a number must be dialed again and again if the desired line is busy. It is obviously impossible for the caller to know when the busy line is cleared, hence the only way to get a call through before the line becomes busy again is to continue the dialing operation practically continuously. Some efforts have been made to solve the problem, but some of the devices available require the constant attention of the caller who must re-initiate the call when he receives a signal that the busy line is open. Others are so slow in their operation that the busy line is seized again by another caller before the original caller can get his call through.

It is, therefore, an object of the present invention to provide a system which will automatically dial any one of several previously recorded numbers and re-dial that same number in the event a busy signal is received until a ringing tone is noted.

Another object of the invention is to provide in an automatic dialing system detecting means for distinguishing between a busy tone and a ringing tone.

One of the primary features of the invention is organized about a storage device for telephone numbers. This device, when placed in circuit with the telephone and actuated, will automatically dial any selected one of a plurality of prerecorded numbers.

The invention also features an electrical device which is capable of distinguishing between ringing and busy tones. In the event of a ringing tone, a signal is given to alert the caller. A busy tone, on the other hand, causes the device to redial the selected number and to continue to re-dial that number until a ringing tone is received.

Still another feature of the invention is an arrangement for compensating for the time delay between dialing the number and receiving the tone. This delay varies from one exchange to another and must be taken into consideration to avoid an erroneous signal in the system.

These and other features of the invention as well as further objects and advantages thereof will be apparent from a reading of the following detailed description taken in connection with the accompanying drawings in which.

In a conventional dial telephone, a call is placed by producing a consecutive series of electric pulses corresponding to a desired number. These pulses trigger stepping relays in the telephone office, there being a separate relay for each digit. The pulses are produced by dialing the desired number. This dialing, in effect, opens and closes the circuit several times in rapid succession, the particular number of times depending upon the digit dialed.

The circuit can be pulsed at a maximum rate of ten per second and a delay of three tenths of a second is necessary between successive dialings of digits or letters. When, for instance, the digit "3" is dialed the circuit is interrupted three times producing three pulses and thereby causing the first relay to step to position three. Before the next digit, "4," for instance, is dialed the circuit remains closed for three tenths of a second. During this time, the input of the pulsing circuit is switched to the second stepping relay in the telephone office. Next when the circuit is pulsed four times by dialing the digit "4," the corresponding relay steps to position four.

In this manner, when two letters and five digits in a telephone number have been dialed, the sender in the telephone office connects the calling telephone to the number that has been dialed and rings that number. When the line is busy, a distinctive tone signal is returned to the calling party to indicate that the phone is in use.

Figure 1:
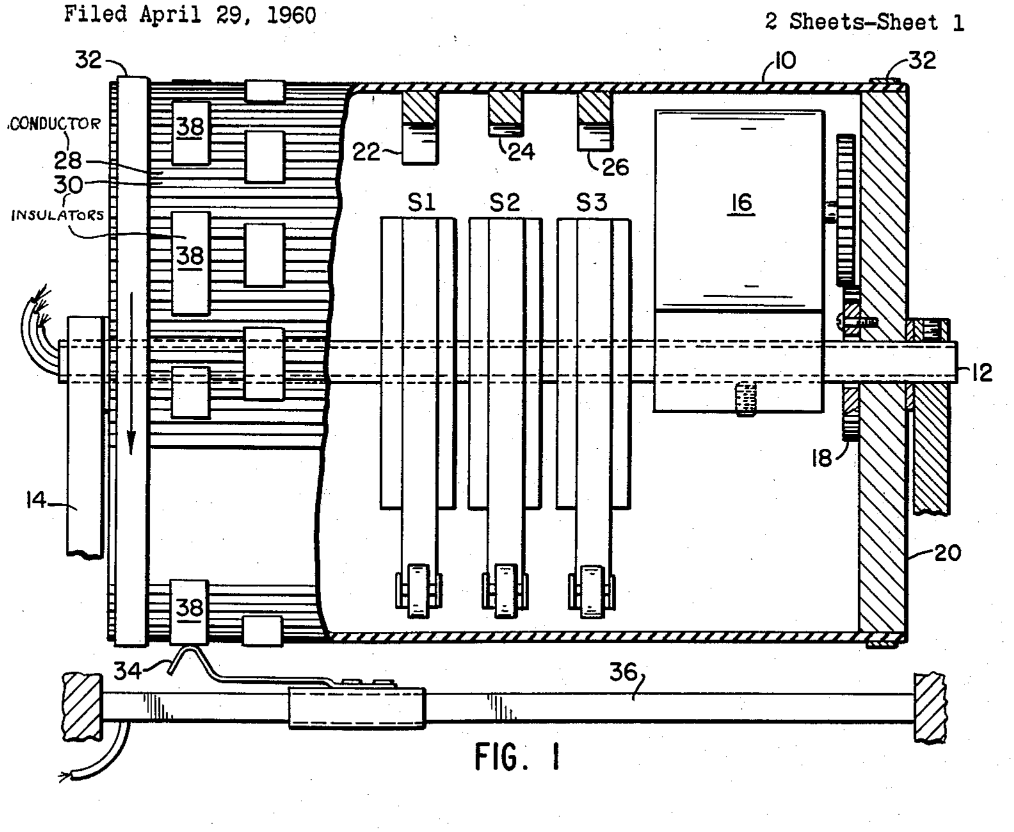
FIG. 1 is a view in side elevation, partly in section of a device for recording and dialing a selected group of telephone numbers.

Referring now to FIG. 1, there is shown a drum 10 rotatably mounted about a fixed axle 12. The outer ends of the axle are supported by means of fixed brackets 14. A motor 16 is secured to the fixed axle 12 and when energized serves to rotate the drum 10 through a gear 18 fastened to an end plate 20. Three micro switches S1, S2, and S3 are also mounted on the axle 12 and are provided with rollers aligned for engagement with a set of cams 22, 24 and 26 applied to the inner surface of the drum.

The outer surface of the drum carries a plurality of spaced conducting strips 28 extending parallel to the drum axis and covering a major portion of the drum surface. The strips are preferably of copper, one-sixteenth of an inch wide, placed alternately with one-sixteenth of an inch wide insulators 30. The copper strips are grounded through conducting hoops 32 engaging opposite ends of the drum. A movable spring contact 34 is mounted to slide along a fixed conducting track 36 arranged parallel to the axle 12.

The drum 10 comprises the basic unit on which telephone numbers are recorded and typically five inches in diameter and seven inches long. A number, UN 4–6900 for example, is recorded on the drum in the following manner (on a telephone dial "U" represents the digit 8 and "N" represents the digit 6). From any reference point on the drum the three conductive strips 28 following the first eight are covered with a piece of insulating tape 38. After exposing the six following conductors another piece of insulation is placed over the next four strips. When the drum rotates, the spring contact first rides over eight conductors, energizing a relay R3 (FIG. 2) eight times intermittently. This pulses the telephone circuit eight times to dial "U." The spring contact then rides over the piece of insulating tape thereby keeping the relay R3 energized and the telephone circuit closed. This provides the delay necessary before dialing the next digit. It then rides over the six conductors again energizing the relay R3 intermittently thereby dialing "N." In this manner, the numbers are recorded and subsequently dialed automatically. After the number is dialed, a cam inside the drum operates a micro switch, shutting off the motor.

Preferably, the drum rotates once every fifteen seconds or at an approximate surface speed of one inch per second. Since on the surface of the drum there are eight conductors per inch, the telephone circuit is pulsed eight times a second and a delay of three eighths of a second is provided between each digit or letter. The slower rate of pulsing makes the system more reliable.

A comparison of the wave forms of a busy signal and a ringing signal shows that the busy signal has an initial pulse which is much larger in amplitude than any portion of the ringing signal. The re-dial circuit used in the present system is designed to be triggered only by the large pulse in the busy signal. A thyratron V1 is used in the system as the trigger element. On receiving a busy signal, the pulse triggers the thyratron which, in firing, energizes a plate relay R1. This relay starts a mechanism which re-dials the number by sliding the recorded number over the spring contact.

Figure 2:
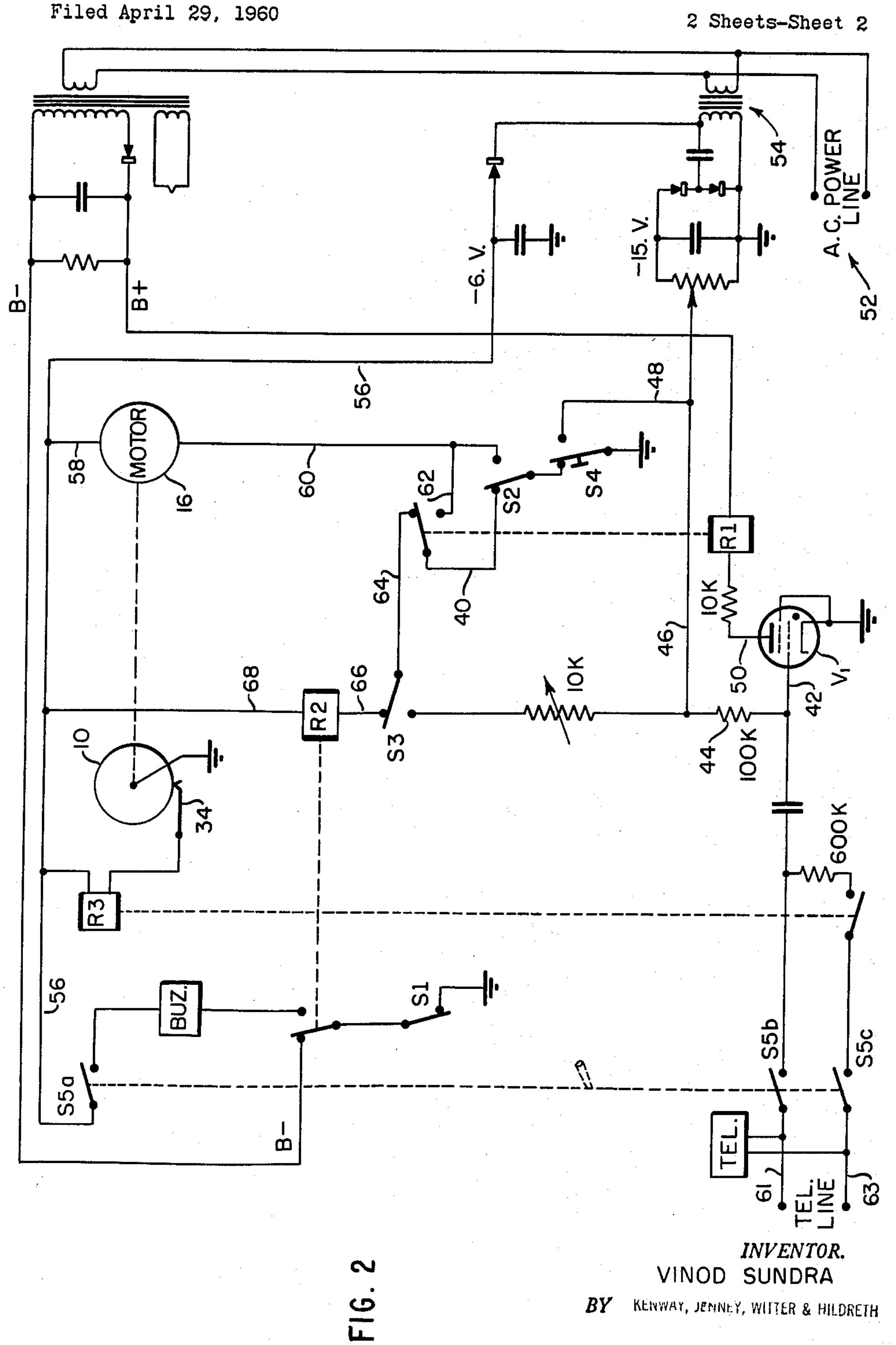
FIG. 2 is a diagram of the circuit of an automatic dialing system made according to this invention.

The operation of the entire system will now be described in detail with particular attention being given to the circuit of FIG. 2.

At the beginning of the signal, cam 22 keeps the normally open switch S1 in a closed position while the cam 24 holds the switch S2 in contact with the lead 40 forming part of the motor circuit. To dial, the spring contact 34 is moved to the desired number and a micro switch S4 is manually pressed momentarily to ground the grid of the thyratron B1. The ground circuit may be traced through a grid lead 42, a 100K resistor 44, a lead 46, a lead 48 through a switch S4 to ground. Pressing of the switch S4 fires the thyratron thus operating the plate relay R1 through a lead 50 having a 10K resistor. When the switch S4 is released, the motor circuit is completed and the drum begins to rotate. This circuit may be traced from an A.C. power source 52 through a transformer 54, a lead 56, a lead 58, the motor 16, a lead 62, the contacts of the relay R1, the lead 40 and swtiches S2 and S4 to ground.

As soon as the drum starts rotating, a 3-pole switch S5 (consisting of switches S5A, S5B, S5C) is manually closed. This connects the telephone leads 61 and 63 to the circuit to permit dialing without lifting the handset from the cradle. A moment later, the swtich S2 returns to its normal position keeping the motor circuit closed without the aid of the relay R1. Then the switch S1 returns to its normally open position, disconnecting the B— supply of the thyratron V1. The thyratron remains in this condition until the number is dialed so that the pulses produced during dialing do not trigger the thyratron. After dialing, the switch S1 is closed by the cam 22 thus connecting the B— to the thyratron and the system is ready to receive the signal.

If the system receives a ringing tone, the thyratron does not fire. One second later the cam 24 presses the switch S2 to open the motor circuit and stop the drum. In biasing the switch S2 into contact with the lead 40, a relay R2 is energized to complete the circuit for a buzzer through the normally closed contacts of the relay R1. The circuit for the buzzer relay R2 also includes a lead 64, the switch S3, a lead 66, the relay R2, and a lead 68 to the lead 56 connected to the A.C. power source 52. The buzzer circuit may be traced from the power lead 56, through the closed contacts of the switch S5A, through the buzzer, the closed contacts of the relay R2, and the closed switch S1 to ground.

The relay R2 in operating also cuts off the B— to the thyratron. (It was found that when the number called was answered, a pulse was received which occasionally triggered the thyratron. This started the motor running and the device re-dialed that number even though it had been obtained. To prevent this, the thyratron had to be disconnected as soon as the drum stopped.) When the buzzer sounds, the receiver is lifted from the cradle and the switch S5 is manually switched back to its normal position. This disconnects the system from the telephone and also turns off the buzzer.

If a busy signal is received, the pulse fed into the thyratron through the lead 42 from the telephone leads 61 and 63, causes the thyratron to fire and thus energizes the relay R1. This completes the circuit of the motor independent of the switch S2 so that when the cam 24 presses the switch S2, the motor will not stop but, will re-dial the number. The switches S1 and S2 operate in the same sequence as when a ringing signal is received. In the case of a busy signal, the buzzer does not sound when the switch S2 closes because the relay R1 in energizing prevents the relay R2 from energizing, keeping the buzzer circuit open. The spring contact 34 rides over a two inch wide copper strip (not shown) for two seconds and then over an insulating material for one second before it begins to re-dial the number. As the contact rides over the conducting strip, the relay R3 is energized and this opens the telephone circuit. This is equivalent to hanging up. When the contact rides over the insulating tape, the telephone circuit is closed. The dial tone is received and the system dials the number again.

Every time the device receives a busy tone, it re-dials that number. When the number being called finally becomes free, the device receives a ringing tone and sounds the buzzer.

It was found that after dialing a telephone number, signals were received after a time interval which varied from exchange to exchange. If the device did not receive a signal within two seconds after dialing, the thyratron would not fire and the motor would come to a stop, removing the B— from the thyratron and sounding the buzzer. If then a busy signal instead of a ringing signal was received, the system would not re-dial because the thyratron was disconnected. The buzzer, in this case, gave the wrong information.

In most instances, the length of time between dialing and receiving a signal varied from one-half second to fifteen seconds depending upon the exchange called. Obviously, to accommodate all exchanges, the length of the cycle could be increased so that the system could receive signals which came as much as fifteen seconds after dialing. But the delay would be unnecessary in the case of exchanges from which signals came in a shorter interval. Therefore, for the system to function efficiently in every situation a variable time delay after dialing is introduced to the circuit.

The length of this delay depends upon the time interval between dialing and receiving a signal. With the modified circuit, the system after dialing a number, stops and waits for a signal. The drum begins to rotate as soon as either signal is received. Therefore, the duration of this temporary stop varies from one-half second to fifteen seconds depending upon the exchange called. From this point on, the sequence is the same as before, that is, the device listens to the signal from the receiver and stop if the tone received is a ringing signal and dials again if the tone received is a busy signal. To start the drum rotating again so that it will follow the above sequence after the temporary stop, the grid bias of the thyratron is reduced for part of the cycle only, thus allowing the thyratron to be fired either by the busy or ringing signal. This energizes the relay R1 and starts the drum rotating.

In summary then, the sequence of operation will be as follows. After dialing the cams 22 and 26 inside the drum first close the switches S1 and S3. One-tenth of a second later, the switch S2 is closed by the cam 24, thus stopping the motor. The switch S1 in closing connects the B— to the thyratron and the switch S3 in closing reduces the bias on the grid of the thyratron so that in this condition either a busy signal or a ringing tone will fire the thyratron. When the thyratron is fired, the relay R1 is energized and the drum starts rotating. After the drum begins to rotate, the switches S2 and S3 return to their normal positions. The switch S2 by returning to its normal position keeps the motor running independent of the relay R1. The switch S3 returns the grid at its normal condition of maximum bias so that only the pulse from a busy signal will trigger the thyratron. A tenth of a second later, the switch S1 returns to its normal position cutting off the power supply to the thyratron. The switch S1 closes again one-half second later connecting the B— supply to the thyratron. If the signal being received is a busy signal, the thyratron fires and sets the device to re-dial the number. If it is a ringing tone, the drum stops and the buzzer sounds.

While the invention has been described in detail with particular reference being made to the embodiments shown in the accompanying drawings, numerous modifications will be apparent to those skilled in the art without departing from the invention. What I claim and desire to obtain by Letters Patent of the United States is:

1. An automatic device for dialing pre-selected exchange numbers in a telephone system, comprising a movable supporting surface, a plurality of spaced conductive segments disposed upon said surface, a contact adapted to bear against said surface to complete a circuit to said telephone system when in contact with any one of said conductive segments, masking elements disposed upon certain of said conductive segments to insulate them from said contacting, a motor for providing relative movement between said surface and said contact, a source of electrical power for said motor, said movement being operative to intermittently open and close said circuit producing a cycle of groups of electrical pulses corresponding to a desired one of said exchange numbers, means for disconnecting said motor from said source of power at the end of said cycle, means for detecting busy tones at the end of said cycle, a switch operatively connected to said detecting means and said motor, said detecting means being operative to close said switch upon detection of a busy signal and thereby complete a circuit to said motor and re-cycle said system.

2. An automatic device for dialing pre-selected exchange numbers in a telephone system comprising a movable supporting surface, a plurality of spaced conductive segments disposed upon said surface, a contact adapted to bear against said surface to complete a circuit to said telephone system when in contact with any one of said conductive segments, masking elements disposed upon certain of said conductive segments to insulate them from said contacting, a motor for providing relative movement between said surface and said contact, a source of electrical power for said motor, said movement causing said circuit to open and close intermittently thereby producing a cycle of groups of electrical pulses corresponding to a desired one of said exchange numbers, means for disconnecting said motor from said source of power at the end of said cycle, detecting means for sensing busy tones at the end of said cycle, an over-riding switch operatively connected to said detecting means and said motor, said detecting means being adapted to close said switch upon detecting a busy signal and thereby complete a circuit to said motor independent of said disconnecting means to re-cycle said system.

3. An automatic device for dialing pre-selected exchange numbers in a telephone system, comprising a movable supporting surface, a plurality of spaced conductive segments disposed upon said surface, a contact adapted to bear against said surface to complete a circuit to said telephone system when in contact with any one of said conductive segments, masking elements disposed upon certain of said conductive segments to insulate them from said contacting, a motor for providing relative movement between said surface and said contact, a source of electrical power for said motor, said movement causing said circuit to open and close intermittently thereby producing a cycle of groups of electrical pulses corresponding to a desired one of said exchange numbers, means for temporarily disconnecting said motor from said source of power at the end of said cycle, detecting means responsive to a busy or a ringing signal for restarting said motor, means for permanently disconnecting said motor from said source of power after said motor has been restarted, an over-riding switch operatively connected to said detecting means and said motor, said detecting means being adapted to close said switch upon detecting a busy signal and thereby complete a circuit to said motor independent of said permanent disconnecting means to recycle said system.

4. An automatic device for dialing pre-selected exchange numbers in a telephone system, comprising a movable supporting surface, a plurality of spaced conductive segments disposed upon said surface, a contact adapted to bear against said surface to complete a circuit to said telephone system when in contact with any one of said conductive segments, masking elements disposed upon certain of said conductive segments to insulate them from said contacting, a motor for providing relative movement between said surface and said contact, a source of electrical power for said motor, said movement causing said circuit to open and close intermittently thereby producing a cycle of groups of electrical pulses corresponding to a desired one of said exchange numbers, means for disconnecting said motor from said source of power at the end of said cycle, an electrical relay operable in response to busy signals characterized by a relatively high voltage impulse and inoperable by a ringing signal characterized by a relatively low voltage impulse, an overriding switch operatively connected to said relay and said motor, said relay being adapted to close said switch upon receiving a busy signal and thereby complete a circuit to said motor independent of said disconnecting means to recycle said system.

5. An automatic device for dialing pre-selected exchange numbers in a telephone system, comprising a movable supporting surface, a plurality of spaced conductive segments disposed upon said surface, a contact adapted to bear against said surface to complete a circuit to said telephone system when in contact with any one of said conductive segments, masking elements disposed upon certain of said conductive segments to insulate them from said contacting, a motor for providing relative movement between said surface and said contact, a source of electrical power for said motor, said movement causing said circuit to open and close intermittently thereby producing a cycle of groups of electrical pulses corresponding to a desired one of said exchange numbers, means for temporarily disconnecting said motor from said source of power at the end of said cycle, an electrical relay operable in response to a busy signal characterized by a relatively high voltage impulse and inoperable by a ringing signal characterized by a relatively low voltage impulse, means for altering said relay to respond to either a busy or a ringing signal after said motor has been temporarily stopped to restart said motor, further means for restoring said relay to its original condition after said motor has restarted, means for permanently disconnecting said motor from said source of power after said motor has been restarted, an over-riding switch operatively connected to said relay and said motor, said relay being adapted to close said switch upon detecting a busy signal and thereby complete a circuit to said motor independent of said permanent disconnecting means to recycle said system.

6. In a system for automatically dialing pre-selected telephone exchange numbers on a telephone line, the combination of a storage device having a plurality of pre-selected numbers in code thereon, switch means for connecting said storage device to said telephone line and for actuating said device to dial one of said pre-selected numbers, a signal detector, said signal detector being conductive in response to signals of a magnitude exceeding a predetermined level, means for connecting said signal detector to said telephone line to receive signals generated by ringing tones and busy tones at the completion of dialing of said one of said pre-selected numbers, the signal generated by said busy tone being of a magnitude exceeding said predetermined level and the signal generated by said ringing tone being of magnitude below said predetermined level, means connected to said signal detector and responsive to conduction thereof for reconnecting said storage device to said telephone line and redialing said one of said pre-selected numbers, means also connected to said signal detector and responsive to non-conduction thereof for discontinuing actuation of said storage device, and an indicator connected to said last-mentioned means for signifying non-conduction in said signal detector and thereby the ringing of said pre-selected number.

7. In the system defined in claim 6, the further combination of a power source and a motor in series circuit relationship with said switch means, said signal detector including a unidirectional conducting device and a relay in series circuit relationship, contacts on said relay also being in series circuit relationship with said motor and said power source, said unidirectional conducting device being responsive in conduction to the presence of a signal exceeding said predetermined level, conduction through said unidirectional conducting device energizing said relay to close said contacts and complete the circuit between said motor and said power source.

References Cited in the file of this patent

UNITED STATES PATENTS

| | | |
|---|---|---|
| 2,191,913 | Lewis | Feb. 27, 1940 |
| 2,363,428 | Lobel | Nov. 21, 1944 |
| 2,537,188 | Kaelin | Jan. 9, 1951 |
| 2,576,189 | Olliver | Nov. 27, 1951 |
| 2,861,131 | Villmann | Nov. 18, 1958 |
| 2,921,142 | Tinus | Jan. 12, 1960 |